(12) United States Patent
Lundstrom et al.

(10) Patent No.: US 8,774,726 B2
(45) Date of Patent: Jul. 8, 2014

(54) ARRANGEMENT AND METHOD FOR SIMULATING A RADIO ACCESS NETWORK

(75) Inventors: Anders Lundstrom, Karlstad (SE); Per Green, Jarfalla (SE); Berndt Backlund, Taby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 785 days.

(21) Appl. No.: 12/531,171

(22) PCT Filed: Apr. 11, 2007

(86) PCT No.: PCT/SE2007/050229
§ 371 (c)(1),
(2), (4) Date: Sep. 14, 2009

(87) PCT Pub. No.: WO2008/127158
PCT Pub. Date: Oct. 23, 2008

(65) Prior Publication Data
US 2010/0099361 A1    Apr. 22, 2010

(51) Int. Cl.
*H04B 17/00* (2006.01)
(52) U.S. Cl.
USPC .................. 455/67.12; 455/67.11
(58) Field of Classification Search
CPC ........... H04B 17/0092; H04B 17/0095; G01R 29/0821; G01R 29/105
USPC .................. 324/627; 343/703; 455/67.11
See application file for complete search history.

(56) References Cited

U.S. PATENT DOCUMENTS

| | | | | |
|---|---|---|---|---|
| 4,560,987 A | * | 12/1985 | Dochow et al. | 342/171 |
| 5,134,405 A | * | 7/1992 | Ishihara et al. | 342/1 |
| 6,114,811 A | * | 9/2000 | Wu | 315/111.21 |
| 6,128,486 A | * | 10/2000 | Keskitalo et al. | 455/422.1 |
| 6,356,025 B1 | * | 3/2002 | Freeman et al. | 315/111.51 |
| 2002/0145570 A1 | * | 10/2002 | Barnes et al. | 343/824 |
| 2002/0160717 A1 | * | 10/2002 | Persson et al. | 455/67.1 |
| 2002/0175869 A1 | * | 11/2002 | Wilcoxson et al. | 343/742 |
| 2003/0008620 A1 | * | 1/2003 | Rowell et al. | 455/67.1 |

(Continued)

FOREIGN PATENT DOCUMENTS

| | | |
|---|---|---|
| DE | 198 12 923 A1 | 9/1999 |
| JP | 2000-278743 A1 | 10/2000 |

(Continued)

OTHER PUBLICATIONS

International Search Report dated Feb. 20, 2008 (4 pages).

(Continued)

*Primary Examiner* — Yuwen Pan
*Assistant Examiner* — Ayodeji Ayotunde
(74) *Attorney, Agent, or Firm* — Myers Bigel Sibley & Sajovec, P.A.

(57) ABSTRACT

The present invention relates to a reverberation chamber (RC) comprising at least one antenna head attached at a first side of the chamber and a stirrer adapted to rotate. The RC comprises an arrangement to enable UE antennas to be placed at a location within the RC such that the stirrer is adapted to rotate to simulate a fading condition for the UE antennas in relation to the antenna heads attached at the first side and that RF connections from the antenna heads are adapted to be connected to a cellular network, such as a closed cellular network.

12 Claims, 6 Drawing Sheets

(56) References Cited

U.S. PATENT DOCUMENTS

| | | | |
|---|---|---|---|
| 2003/0184417 A1* | 10/2003 | Li et al. | 333/227 |
| 2006/0017630 A1* | 1/2006 | Kildal | 343/703 |
| 2006/0255998 A1* | 11/2006 | Hirata et al. | 342/1 |

FOREIGN PATENT DOCUMENTS

| | | | |
|---|---|---|---|
| JP | 2000-324063 A1 | 11/2000 |
| JP | 2004-347439 A1 | 12/2004 |
| JP | 2005-260853 A1 | 9/2005 |
| JP | 2005-347524 A1 | 12/2005 |
| WO | WO 02/056041 A1 | 7/2002 |
| WO | WO 2005/003795 A1 | 1/2005 |

OTHER PUBLICATIONS

Written Opinion dated Feb. 20, 2008 (5 pages).

* cited by examiner

Fig. 2 Physical layout

ARRANGEMENT AND METHOD FOR SIMULATING A RADIO ACCESS NETWORK

TECHNICAL FIELD

The present invention relates to an arrangement and a method for performing simulations of a radio access network (RAN). In particular, the present invention relates to simulation of a RAN by using a reverberation chamber.

BACKGROUND

FIG. 1 schematically illustrates a WCDMA RAN that generally comprises one or more radio network controllers (RNC) 110 and Radio Base Stations (RBSs) 120a,b. The RNC 110 is connected via cables to the core network 105 and to the RBSs 120a, 120b. The RBSs 120 are adapted to communicate wirelessly with user equipments (UEs) 130a-d, also referred to as mobile terminals over the radio interface.

Two types of testing will be considered in the following: stability/performance/resource testing of a WCDMA RAN and WCDMA cell capacity testing. The aim of stability/performance/resource testing of the WCDMA RAN is to verify the stability and performance and resource usage of the WCMDA RAN. This implies that the interaction between different resource handling algorithms and radio algorithms are tested with real traffic at high traffic load levels. Cell Capacity testing implies testing of cell capacity with load generated by many concurrent users within the cell. The purpose of this testing is to verify cell capacity against theoretical requirements and to identify performance limits, for example increase of uplink interference versus traffic load.

Laboratory testing of a WCMDA RAN is performed in an environment consisting of a number of RBSs, whereby each RBS has one or more cells as shown in FIG. 2 illustrating the physical layout. These RBSs 201-204 are controlled by the RNC 200 which is attached to the core network. Traffic is generated in the radio cells by real mobile terminals (UEs). The cells and the UEs are connected via a Closed Cellular Network (CCN) which provides mobility over cell boarders for the attached UEs. Hence, the CCN 206 is variable attenuation system comprising of a coaxial network. The CCN 206 simulates UE mobility and it is possible to define a drive route. The mobility simulations of the CCN 206 are able to consider interference but fading is not taken into account. The corresponding logical layout is illustrated in FIG. 3.

The UEs are arranged in UE-groups 207-210, wherein all UEs within in a UE-group are connected to all cells (only cell and cell 2 of RBS 1 are indicated in FIG. 2) within the radio network and the UEs perform cell selection to identify best serving cell within the network. Each group consists of typical 8-14 UEs. For each UE-group a drive route 211, 212 through the CCN could be defined. with the purpose of testing the RAN in terms of a number of key performance indicators such as call setup success rates, drop rates, handover success rates et cetera.

Laboratory testing of WCDMA cell capacity is currently made in an RF-chamber with 1 up to 50 UEs attached to a cell via coaxial cables. Requirements related to cell capacity include specifications of radio conditions valid for the requirement, such as non-fading or fading of the radio channel. As an example, a requirement could state that the uplink interference shall not increase more than y dB with x simultaneous speech users in the cell with a radio channel according to TU3 (Typical Urban 3 km/h, standardized channel model with fading).

When fading is required, the fading is typical generated with channel emulators, where each of the currently used emulators could handle e.g. three radio channels. Hence a UE with uplink and downlink fading plus uplink diversity would require 3 channels i.e. one channel emulator per UE.

For the WCDMA cell capacity testing, it would be difficult to provide independent fading for all UEs when the number of required UEs outnumbers the available channel emulators due to cost as well as practical reasons. When that is the case, more than one UE has to share the same channel emulator resource. The lack of independent fading will cause too high correlation between UEs on the same channel emulator. This in turn would cause the power regulation to increase the power to too high levels causing too high interference in the cell.

Also for the Stability/performance/resource testing of WCDMA RAN, the current solution does not provide a realistic radio environment since coaxial cables are used to connect UEs to the RAN. As stated above, the normal way to introduce fading in a lab environment (i.e. connection via coaxial cables) is to insert a channel emulator in between the UE and the RBS which implies the drawbacks as mentioned above. Thus, simulation of fading by using channel emulators require too many emulators and additionally the performance is not good enough. This means that fading which an important characteristic of the radio environment can not be taken into account by the current solution.

Without fading important properties of RAN like power control and resource handling cannot be tested thoroughly.

SUMMARY

Thus an object of the present invention is to achieve an arrangement and a method for testing of WCDMA RAN that provides a realistic radio environment.

The object is achieved by placing the UEs into Reverberation Chambers (RC) and to replace the last part of the coaxial cable connections between the UEs and the RBSs with a radio connection in the RC. The concept of the RC includes a stirrer that will cause stirring of the radio waves and thereby create fading. The same concept is applicable for both of the Stability/performance/resource testing of a RAN and cell capacity testing.

According to a first aspect the present invention relates to a reverberation chamber (RC) comprising at least one antenna head attached at a first side of the chamber and a stirrer adapted to rotate. The RC comprises an arrangement to enable UE antennas to be placed at a location within the RC such that the stirrer is adapted to rotate to simulate a fading condition for the UE antennas in relation to the antenna heads attached at the first side and that RF connections from the antenna heads are adapted to be connected to a cellular network, such as a closed cellular network.

According to a second aspect, the present invention relates to a method for simulating a radio environment. The method comprises the steps of inserting at least one UE antenna into a reverberation chamber having a stirrer adapted to rotate and at least one antenna head attached at a first side of the chamber, establishing a radio connection to the between the at least one UE antenna and the antenna head, and simulating a fading condition by means of the stirrer that is located between the at least one UE antenna and the at least one antenna head. Further, RF connections from the at least one antenna head are adapted to be connected to a cellular network.

An advantage with embodiments of the present invention is that it introduces fading for such a large test environment as the Cellular Cable Network. Thereby a more realistic radio environment could be achieved in controllable way.

A further advantage is that the invention is scalable, which implies that both large and small configurations can be used.

A yet further advantage is that the encapsulation of UEs in the fading boxes of the invention reduces the exposure to electromagnetic radiation.

DETAILED DESCRIPTION

In the following detailed description, the embodiments of the present invention is described in the context of a WCDMA RAN. It should be appreciated that the present invention is applicable for any radio access technology. Further, the embodiments of the present invention is described in the context of Stability/performance/resource testing of WCDMA RAN, with reverberation chambers (RC) connected to a CCN. It should however be appreciated that the same principles will be applicable for RAN Cell Capacity testing using any access technology. Further, in the case of RAN Cell capacity testing, the RCs could also be connected to a Radio Base Station (RBS) instead of the CCN.

Figure 1:
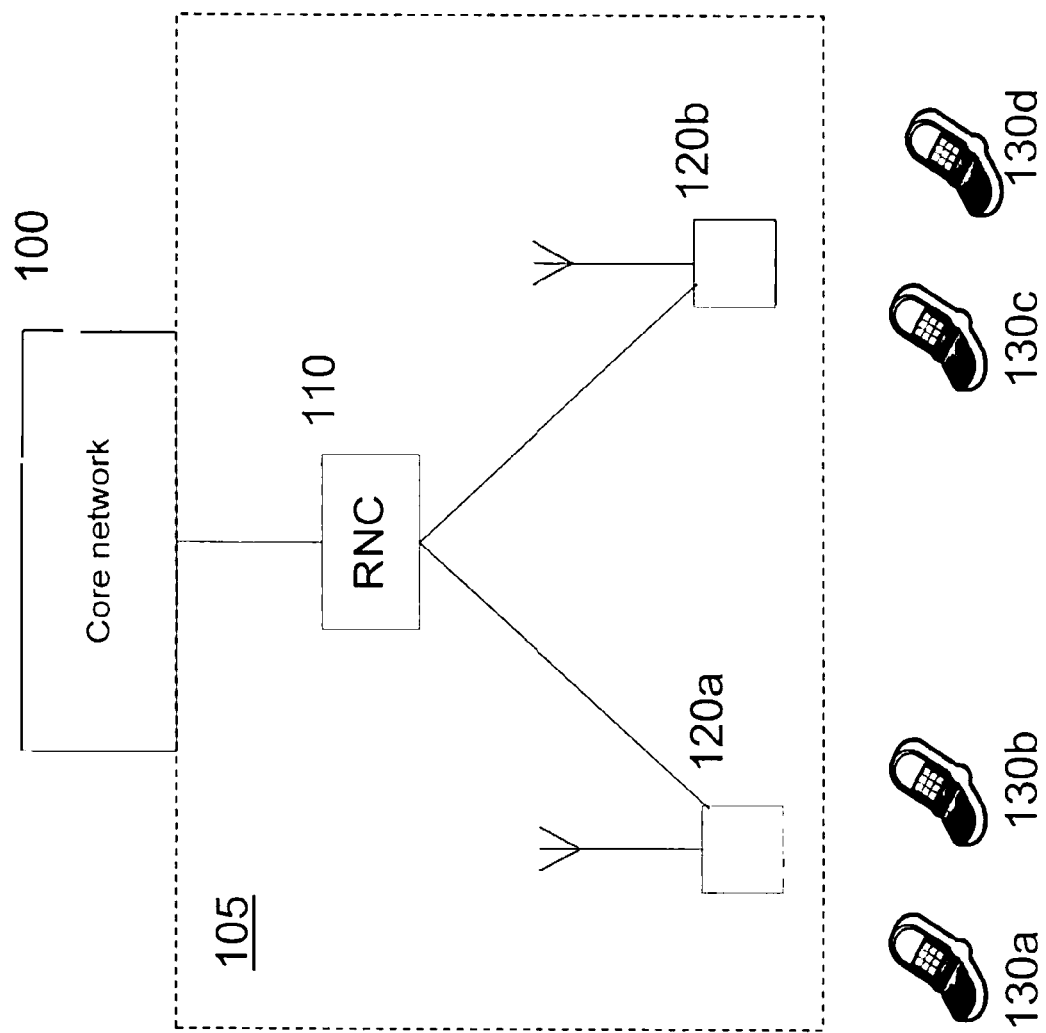
FIG. 1 schematically illustrates a WCDMA radio network.
Figure 2:
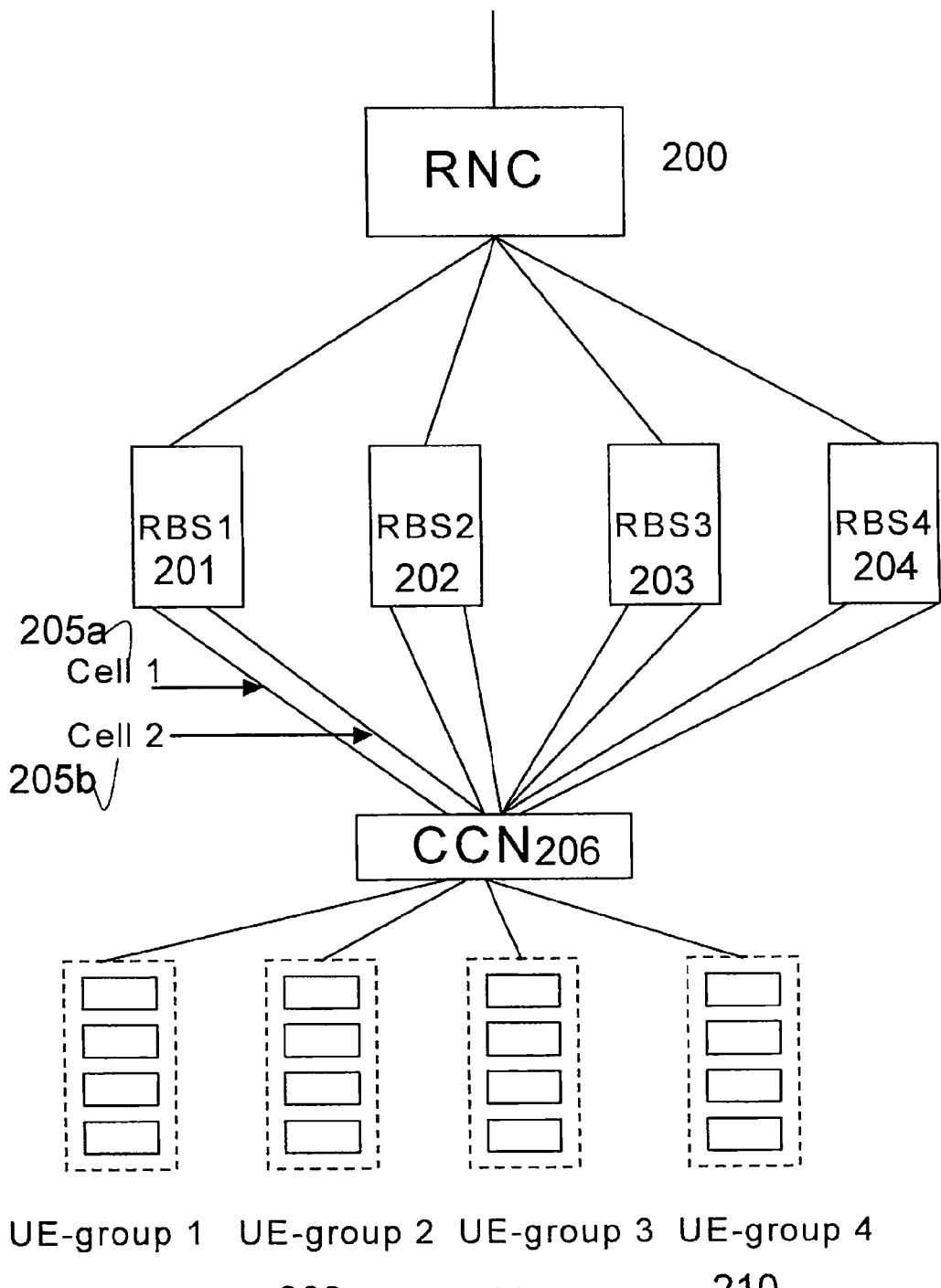
FIG. 2 illustrates the physical layout of a test configuration.
Figure 3:
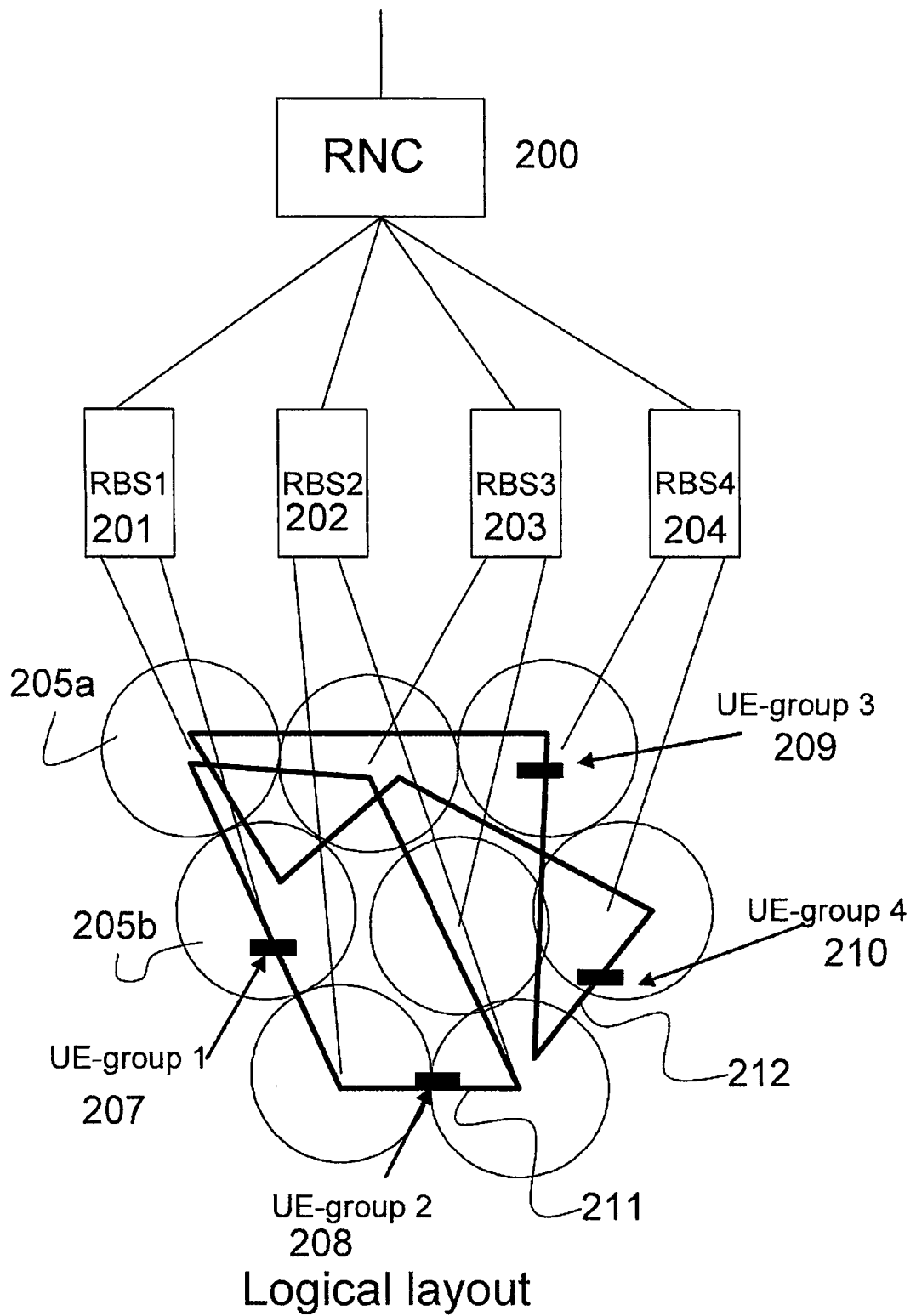
FIG. 3 illustrates the logical layout of a test configuration.

Turning now to FIGS. 2 and 3 showing a principle figure of the current test setup. FIG. 2 shows the physical layout, while FIG. 3 shows the logical layout of the test setup.

In accordance with the physical layout, each RBS 201-204 is connected to the RNC 200 and to the CCN 206 forming a cellular network. The UEs are grouped into UE groups 207-210 and are connected to the CCN 206. Each UE group contains 8-14 UEs, wherein the UE groups corresponds to UEs located within a specific area. It should be noted that said specific area changes as the UE group moves. Further, the CCN 206 interconnects the cells with the UE-groups via a set of variable attenuators.

In accordance with the logical layout, the CCN 206 provides means to define size of cells and to define drive speed and drive routes 211, 212 through CCN 206 for each of the attached UE-groups 207-210. The UEs are configured to generate traffic according to predefined user models.

The object of the invention is to enhance the above described test configuration with a fading radio environment. This is done according to the present invention by encapsulating each of the above UE-groups within a Reverberation Chamber, also referred to as a fading box. An electromagnetic reverberation chamber is an environment for electromagnetic compatibility (EMC) testing and other electromagnetic investigations. The reverberation chamber is a screened room with a minimum of absorption of electromagnetic energy. Due to the low absorption very high field strength very high field strength can be achieved with moderate input power. Further, the reverberation chamber is a cavity resonator with a high Q factor. The Q factor compares the time constant for decay of an oscillating physical system's amplitude to its oscillation period. Thus the spatial distribution of the electrical and magnetical field strength is strongly inhomegenious, which implies standing waves. To reduce this inhomogenity, one or more stirrers are used. A stirrer is a construction with large metallic reflectors that can be moved to different orientations in order to achieve different boundary conditions. The lowest usable frequency depends on the size of the chamber and the design of the stirrer.

Figure 4:
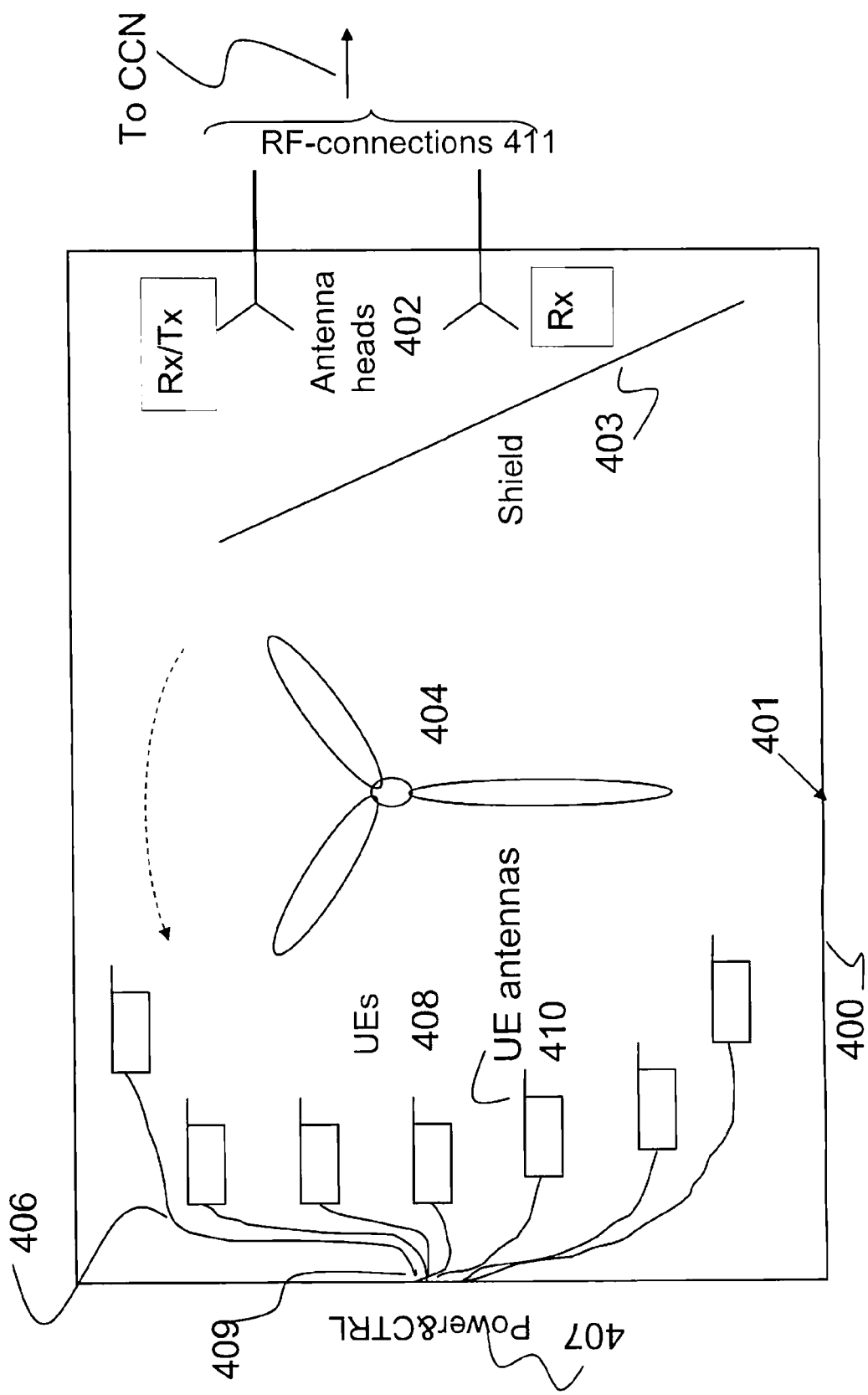
FIG. 4 illustrates a principle layout for a reverberation chamber for WCDMA ran testing according to an embodiment of the present invention.

The principle layout of an RC for this application according to an embodiment of the present invention is illustrated by FIG. 4.

For the purpose of distinguishing the RC according to embodiments of the present invention from other RCs it will further on be referred to as a fading box. FIG. 4 discloses a fading box 400 that is RF-shielded with RF-reflecting inside surfaces 401. Antenna heads 402 are mounted at one end of the fading box (referred to as the first side), and connected to the CCN via external connectors 411. A shield 403 may be used to prevent line of sight for the UEs 408 in the fading box. The rotating device 404, referred to as stirrer, should be made of an RF-reflecting material and preferably driven by a speed controlled motor. The UEs 408 are placed in the fading box 400 with "free" antennas 410, i.e. no RF cabling between the UEs and the antennas is provided. However cabling is required for the provision of power and test control management 407 through RF-shielded physical interface connections 406. The power and test control management 407 such as power supply provides the UEs with power and RF-tight control interface connectors for the UEs manages the control of traffic generation such as the control of packet data and web traffic.

In order to achieve the fading, the rotating RF-reflecting stirrer with speed controlled motor is located between the UE antennas and the antenna head attached to the fading box. Thus, the fading is created due to scattering of RF-signals at the surface of the rotating device where fading characteristics will be related to the rotating speed of the device and the size and shape of the fading box. Time dispersion could be introduced either as insertion of a delay line before one of the antenna heads on one of the antenna branches or by usage of materials with very high dielectric constant. A shield made of a material with high dielectric constant could be inserted in front of one of the antennas. Therefore, an arrangement 409 is provided to enable UE antennas to be placed at a location within the RC such that the stirrer is adapted to rotate to simulate a fading condition for the UE antennas in relation to the antenna heads.

Furthermore, a climate control may provided or at least a fan for forced ventilation of the fading box, since the temperature should not raise above 25-30° C.

Moreover, when the UE is placed inside the fading box as illustrated in FIG. 4, the UEs need to be placed in fixed positions. In addition some kind of shielding of UEs may also be provided in order to simulate 'position head' or 'position table'. Position head refers to a handheld UE used for speech where the human head shields the antenna and position table refers to a UE when used as wireless connection for a laptop.

According to embodiments of the invention, one smaller fading box capable of housing 12-20 UEs is provided and a larger fading box capable of housing around 50-150 UEs is provided.

The smaller fading box is intended to be used in the CCN and to replace the existing concept of UE racks which is the physical arrangements of UE-groups. The size of this box should be large enough to enable an easy handling of UEs still with a small footprint (the box should preferably have a similar size as the UE-rack). This since a CCN supports up to 8 UE-groups (UE-racks) and each of these UE-groups needs to be placed into a fading box, which implies eight fading boxes per CCN. Each fading box should also provide a fading environment that is good enough compared to standardized channel models. In this case with the smaller fading box, the presence of fading is more important than the resemblance with any standardized channel model.

The larger fading box is suitable to be used for capacity testing due to the need to handle up to 150 UEs. In this case the fading box is in principle a RF-chamber.

Thus, the requirements on the small and the large fading box might differ. For the small fading box used for RAN Stability/performance/resource testing the requirements could be more "loose". That is due to the fact that the use of the fading box instead of coaxial connections provides such an improvement that details on fading characteristics and path delays are of secondary importance. In contrast, the requirements for the large fading box, the cell capacity, has to be more précis in terms of resemblance with standardized fading models, multi path delays, tuning of antenna correlation et cetera.

As stated above, the fading box is a RF-tight box with RF-reflecting inside surfaces. The small fading box may have a dimension of 0.6×0, 6×1.8 (corresponding to d×b×a of FIG. 5) meters, and the large fading box a dimension of 2×3×2 meters.

It should be noted that the UEs may be located within the fading box, or alternatively located outside the fading box but having their respective UE antenna placed inside the fading box.

Figure 5:
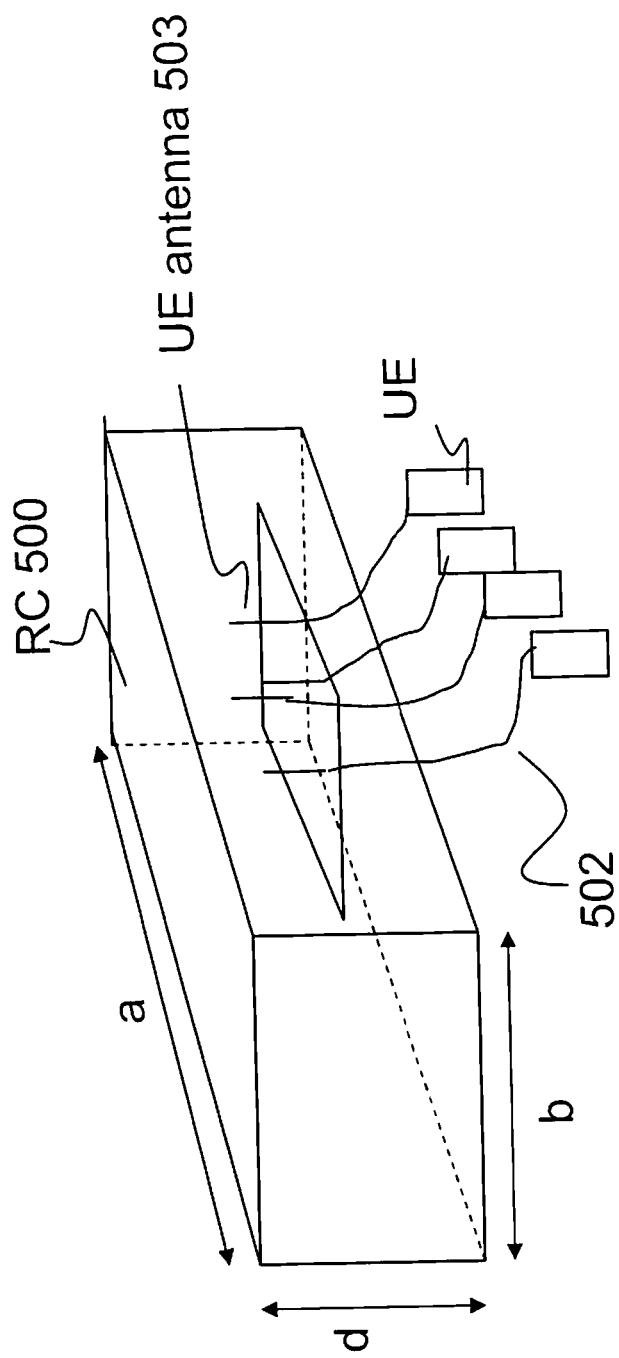
FIG. 5 illustrates the case when the UEs are placed outside the fading box in accordance with one embodiment of the invention.

Turning now to FIG. 5, illustrating an embodiment where the UEs are located outside the fading box 500. The UEs external antenna connectors 501 will be used (same connection as used when placed in car mounted holder). These external antenna connectors 502 will be connected via coaxial cables 502 to dipole antennas 503 inside the fading box. The purpose of FIG. 5 is to illustrate the connections of the UEs to the fading box. It should therefore be noted that the stirrer, antenna heads and other elements of the fading box are omitted in FIG. 5 for the sake of simplicity.

Figure 6:
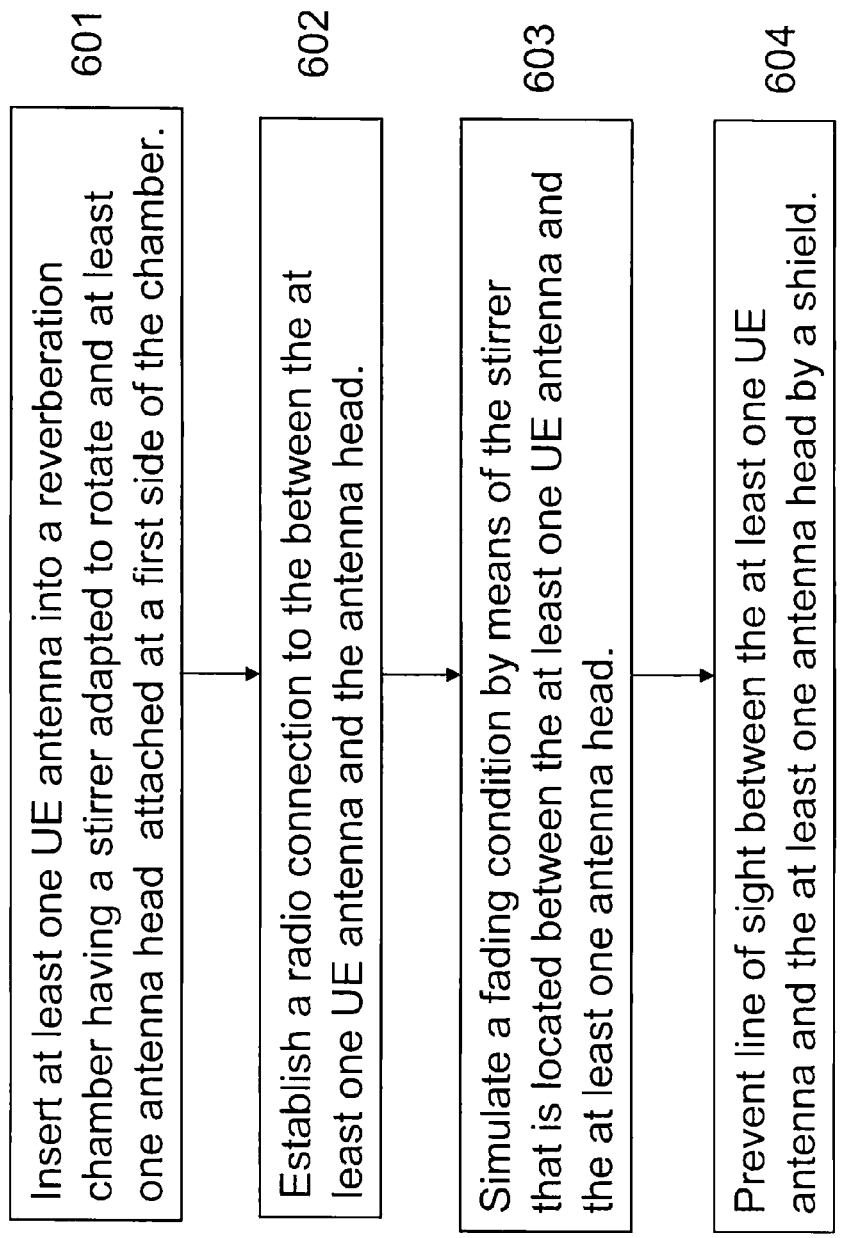
FIG. 6 is a flowchart of a method according to one embodiment of the present invention.

Moreover, the present invention relates to a method for simulating a radio environment. An embodiment is illustrated in the flowchart of FIG. 6. It comprises the steps of:

601. Insert at least one UE antenna into a reverberation chamber having a stirrer adapted to rotate and at least one antenna head attached at a first side of the chamber, wherein RF connections from the at least one antenna head are adapted to be connected to a cellular network.

602. Establish a radio connection to the between the at least one UE antenna and the antenna head.

603. Simulate a fading condition by means of the stirrer that is located between the at least one UE antenna and the at least one antenna head.

604. Prevent line of sight between the at least one UE antenna and the at least one antenna head by a shield.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A reverberation chamber (RC) comprising:
   at least one antenna head attached at a first side of the reverberation chamber, each antenna head, of the at least one antenna head, including a Radio Frequency (RF) connection;
   a stirrer;
   an area to accommodate User equipment (UE) antennas; and
   a shield inside the reverberation chamber between the at least one antenna head and the UE antennas, the shield having RF-reflecting surfaces configured to prevent line of sight transmission between the at least one antenna head and the UE antennas,
   wherein the stirrer is configured to rotate to scatter RF signals to create a fading condition for the UE antennas in relation to the at least one antenna head attached at the first side, and
   wherein the RF connection, from each antenna head of the at least one antenna head, is to connect to a cellular network.

2. The RC according to claim 1, where the fading condition is Rayleigh fading.

3. The RC according to claim 1, where the area further enables User Equipment (UEs), to which the respective UE antennas are connected, to be placed within the RC.

4. The RC according to claim 1, where the area further enables User Equipment (UEs), to which the respective UE antennas are connected, to be placed outside the RC.

5. The RC according to claim 1, further comprising: a climate control system to control the temperature within the RC.

6. The RC according to claim 1, where the area accommodates 12-20 User Equipment (UEs).

7. The RC according to claim 1, where the area accommodates 50-120 User Equipment (UEs).

8. The RC according to claim 1, where the cellular network is a closed cellular network.

9. The RC according to claim 1, where each RF connection, from each antenna head of the at least one antenna head, is to be connected to the cellular network via a radio base station.

10. A method for simulating a radio environment, the method comprising:
    inserting at least one User Equipment (UE) antenna into a reverberation chamber, the reverberation chamber including a stirrer adapted to rotate and at least one antenna head attached at a first side of the chamber and a shield inside the reverberation chamber between the at least one antenna head and the at least one UE antenna, wherein the shield has RF-reflecting surfaces configured to prevent line of sight transmission between the at least one antenna head and the at least one UE antenna, the stirrer being located between the at least one UE antenna and the at least one antenna head, and RF connections from the at least one antenna head connect to a cellular network;
    establishing a radio connection between the at least one UE antenna and the at least one antenna head; and
    simulating a fading condition by rotating the stirrer.

11. The RC according to claim 1, wherein the RF-reflecting surfaces of the shield are further configured to prevent line of sight transmission between the at least one antenna head and the stirrer.

12. The method according to claim 10, further comprising preventing line of sight transmission by the RF-reflective surfaces of the shield between the at least one antenna head and the stirrer.

* * * * *

UNITED STATES PATENT AND TRADEMARK OFFICE
CERTIFICATE OF CORRECTION

PATENT NO. : 8,774,726 B2
APPLICATION NO. : 12/531171
DATED : July 8, 2014
INVENTOR(S) : Lundstrom et al.

Page 1 of 1

It is certified that error appears in the above-identified patent and that said Letters Patent is hereby corrected as shown below:

In the Specification

In Column 1, Line 49, delete "cell" and insert -- cell 1 --, therefor.

In Column 1, Line 54, delete "defined." and insert -- defined, --, therefor.

In Column 5, Line 26, delete "0.6×0, 6" and insert -- 0.6×0.6 --, therefor.

Signed and Sealed this
Thirty-first Day of March, 2015

Michelle K. Lee
*Director of the United States Patent and Trademark Office*